US011737084B2

(12) United States Patent
Yang et al.

(10) Patent No.: US 11,737,084 B2
(45) Date of Patent: Aug. 22, 2023

(54) DEMODULATION REFERENCE SIGNAL PORT HOPPING FOR GRANT-FREE PHYSICAL UPLINK SHARED CHANNEL COMMUNICATION

(71) Applicant: QUALCOMM Incorporated, San Diego, CA (US)

(72) Inventors: Wei Yang, San Diego, CA (US); Seyong Park, San Diego, CA (US); Jing Jiang, San Diego, CA (US); Jay Kumar Sundararajan, San Diego, CA (US); Chih-Ping Li, San Diego, CA (US); Seyedkianoush Hosseini, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 16/525,035

(22) Filed: Jul. 29, 2019

(65) Prior Publication Data
US 2020/0037347 A1    Jan. 30, 2020

Related U.S. Application Data

(60) Provisional application No. 62/712,026, filed on Jul. 30, 2018.

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04W 72/23* (2023.01)

(58) Field of Classification Search
CPC ............ H04L 5/0051; H04W 72/1268; H04W 72/1289; H04W 72/14
See application file for complete search history.

(56) References Cited

U.S. PATENT DOCUMENTS

2016/0095137 A1* 3/2016 Chen ................... H04L 5/0048
370/329
2016/0192385 A1* 6/2016 Tooher ............... H04L 27/2611
370/336

(Continued)

FOREIGN PATENT DOCUMENTS

EP          3439218 A1    2/2019
WO    2014113546 A1    7/2014
WO    2017171314 A1    10/2017

OTHER PUBLICATIONS

International Search Report and Written Opinion—PCT/US2019/044167—ISA/EPO—dated Oct. 29, 2019.

*Primary Examiner* — Derrick W Ferris
*Assistant Examiner* — M Mostazir Rahman
(74) *Attorney, Agent, or Firm* — QUALCOMM Incorporated

(57) ABSTRACT

Various aspects of the present disclosure generally relate to wireless communication. In some aspects, a user equipment may receive a configuration message with a configured grant for a plurality of uplink transmissions. The user equipment may transmit, using a first demodulation reference signal port, a first transmission, of the plurality of uplink transmissions, associated with the configured grant. The user equipment may transmit, using a second demodulation reference signal port that is different from the first demodulation reference signal port, a second transmission, of the plurality of uplink transmissions, associated with the configured grant. Numerous other aspects are provided.

30 Claims, 13 Drawing Sheets

(56) References Cited

U.S. PATENT DOCUMENTS

| | | | |
|---|---|---|---|
| 2019/0158171 A1* | 5/2019 | Ren | H04B 7/0663 |
| 2020/0008235 A1* | 1/2020 | Sarkis | H04L 5/0055 |
| 2020/0008270 A1* | 1/2020 | Zhang | H04L 5/0048 |
| 2020/0213161 A1* | 7/2020 | Zhang | H04L 5/0092 |

\* cited by examiner

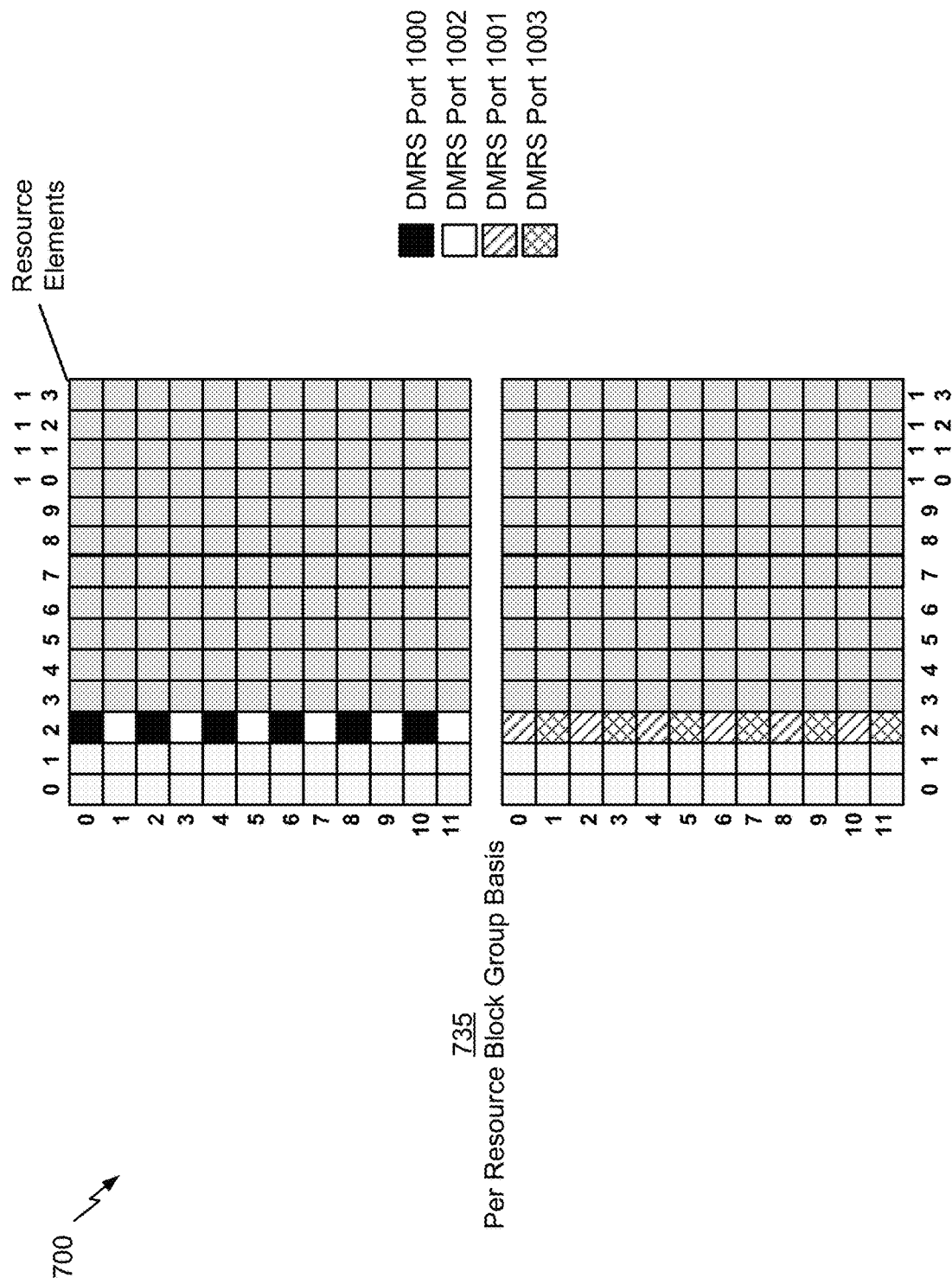

DEMODULATION REFERENCE SIGNAL PORT HOPPING FOR GRANT-FREE PHYSICAL UPLINK SHARED CHANNEL COMMUNICATION

CROSS-REFERENCE TO RELATED APPLICATIONS UNDER 35 U.S.C. § 119

This application claims priority to U.S. Provisional Patent Application No. 62/712,026, filed on Jul. 30, 2018, entitled "DEMODULATION REFERENCE SIGNAL PORT HOPPING FOR GRANT-FREE PHYSICAL UPLINK SHARED CHANNEL COMMUNICATION," which is hereby expressly incorporated by reference herein.

FIELD OF THE DISCLOSURE

Aspects of the present disclosure generally relate to wireless communication, and to techniques and apparatuses for demodulation reference signal port hopping for grant-free physical uplink shared channel communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration message with a configured grant for a plurality of uplink transmissions. The method may include transmitting, using a first demodulation reference signal port, a first transmission, of the plurality of uplink transmissions, associated with the configured grant. The method may include transmitting, using a second demodulation reference signal port that is different from the first demodulation reference signal port, a second transmission, of the plurality of uplink transmissions, associated with the configured grant.

In some aspects, a user equipment for wireless communication may include memory and one or more processors coupled with the memory. The memory and the one or more processors may be configured to receive a configuration message with a configured grant for a plurality of uplink transmissions. The memory and the one or more processors may be configured to transmit, using a first demodulation reference signal port, a first transmission, of the plurality of uplink transmissions, associated with the configured grant. The memory and the one or more processors may be configured to transmit, using a second demodulation reference signal port that is different from the first demodulation reference signal port, a second transmission, of the plurality of uplink transmissions, associated with the configured grant.

In some aspects, a non-transitory computer-readable medium may store one or more instructions for wireless communication. The one or more instructions, when executed by one or more processors of a user equipment, may cause the one or more processors to receive a configuration message with a configured grant for a plurality of uplink transmissions. The one or more instructions, when executed by the one or more processors of the user equipment, may cause the one or more processors to transmit, using a first demodulation reference signal port, a first transmission, of the plurality of uplink transmissions, associated with the configured grant. The one or more instructions, when executed by the one or more processors of the user equipment, may cause the one or more processors to transmit, using a second demodulation reference signal port that is different from the first demodulation reference signal port, a second transmission, of the plurality of uplink transmissions, associated with the configured grant.

In some aspects, an apparatus for wireless communication may include means for receiving a configuration message with a configured grant for a plurality of uplink transmissions. The apparatus may include means for transmitting, using a first demodulation reference signal port, a first transmission, of the plurality of uplink transmissions, associated with the configured grant. The apparatus may include means for transmitting, using a second demodulation reference signal port that is different from the first demodulation reference signal port, a second transmission, of the plurality of uplink transmissions, associated with the configured grant.

In some aspects, a method of wireless communication, performed by a base station (BS), may include providing a configuration message with a configured grant for a plurality of uplink transmissions, wherein the configuration message includes configuration information to cause a user equipment (UE) to transmit using a particular demodulation reference signal (DMRS) port hopping configuration. The method may include receiving a plurality of transmissions associated with the configured grant from the UE based at least in part on the particular DMRS port hopping configuration.

In some aspects, a base station for wireless communication may include memory and one or more processors coupled with the memory. The memory and the one or more processors may be configured to provide a configuration message with a configured grant for a plurality of uplink transmissions, wherein the configuration message includes configuration information to cause a UE to transmit using a particular DMRS port hopping configuration. The memory and the one or more processors may be configured to receive a plurality of transmissions associated with the configured grant from the UE based at least in part on the particular DMRS port hopping configuration.

In some aspects, a non-transitory computer-readable medium may store one or more instructions for wireless communication. The one or more instructions, when executed by one or more processors of a base station, may cause the one or more processors to provide a configuration message with a configured grant for a plurality of uplink transmissions, wherein the configuration message includes configuration information to cause UE to transmit using a particular DMRS port hopping configuration. The one or more instructions, when executed by the one or more processors of the base station, may cause the one or more processors to receive a plurality of transmissions associated with the configured grant from the UE based at least in part on the particular DMRS port hopping configuration.

In some aspects, an apparatus for wireless communication may include means for providing a configuration message with a configured grant for a plurality of uplink transmissions, wherein the configuration message includes configuration information to cause a UE to transmit using a particular DMRS port hopping configuration. The apparatus may include means for receiving a plurality of transmissions associated with the configured grant from the UE based at least in part on the particular DMRS port hopping configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples of demodulation reference signal port hopping, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
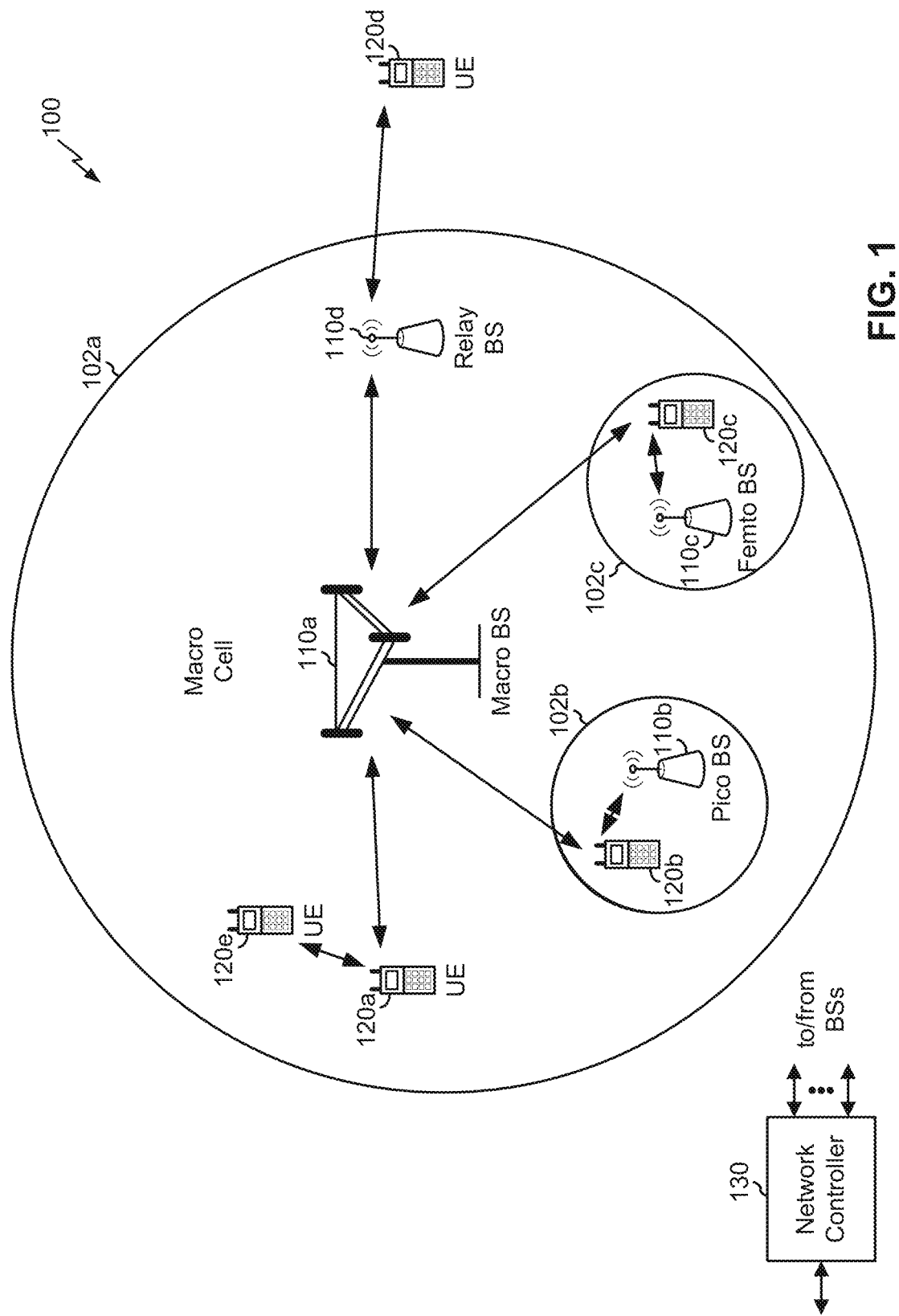
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
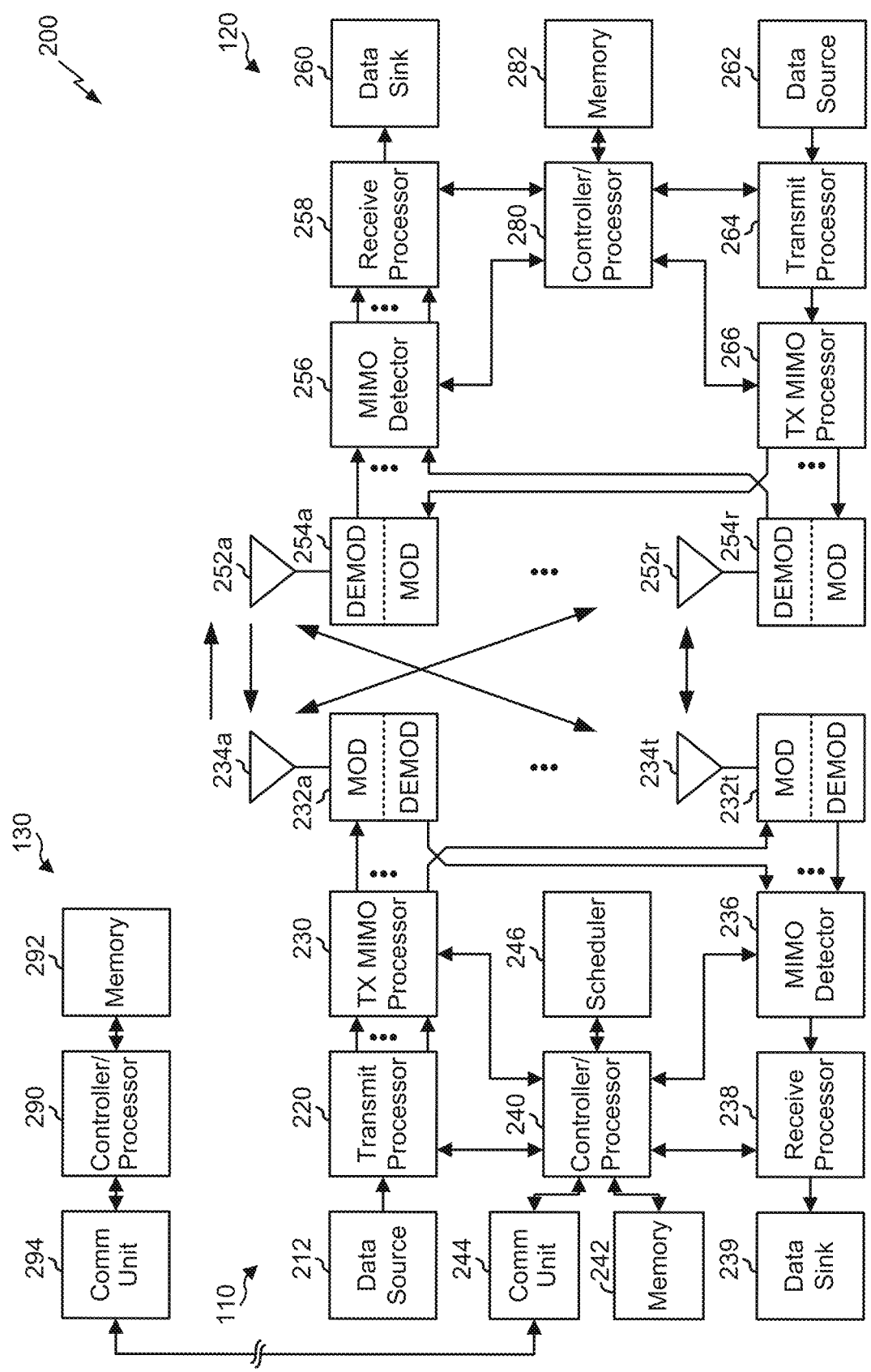
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal port hopping, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration message with a configured grant for a plurality of uplink transmissions, means for transmitting, using a first demodulation reference signal port, a first transmission, of the plurality of uplink transmissions, associated with the configured grant, means for transmitting, using a second demodulation reference signal port that is different from the first demodulation reference signal port, a second transmission, of the plurality of uplink transmissions, associated with the configured grant, and/or the like. In some aspects, such means may include one or more components of UE 120 described in connection with FIG. 2.

In some aspects, base station 110 may include means for providing a configuration message with a configured grant for a plurality of uplink transmissions, wherein the configuration message includes configuration information to cause a user equipment (UE) to transmit using a particular demodulation reference signal (DMRS) port hopping configuration, means for receiving a plurality of transmissions associated with the configured grant from the UE based at least in part on the particular DMRS port hopping configuration, and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
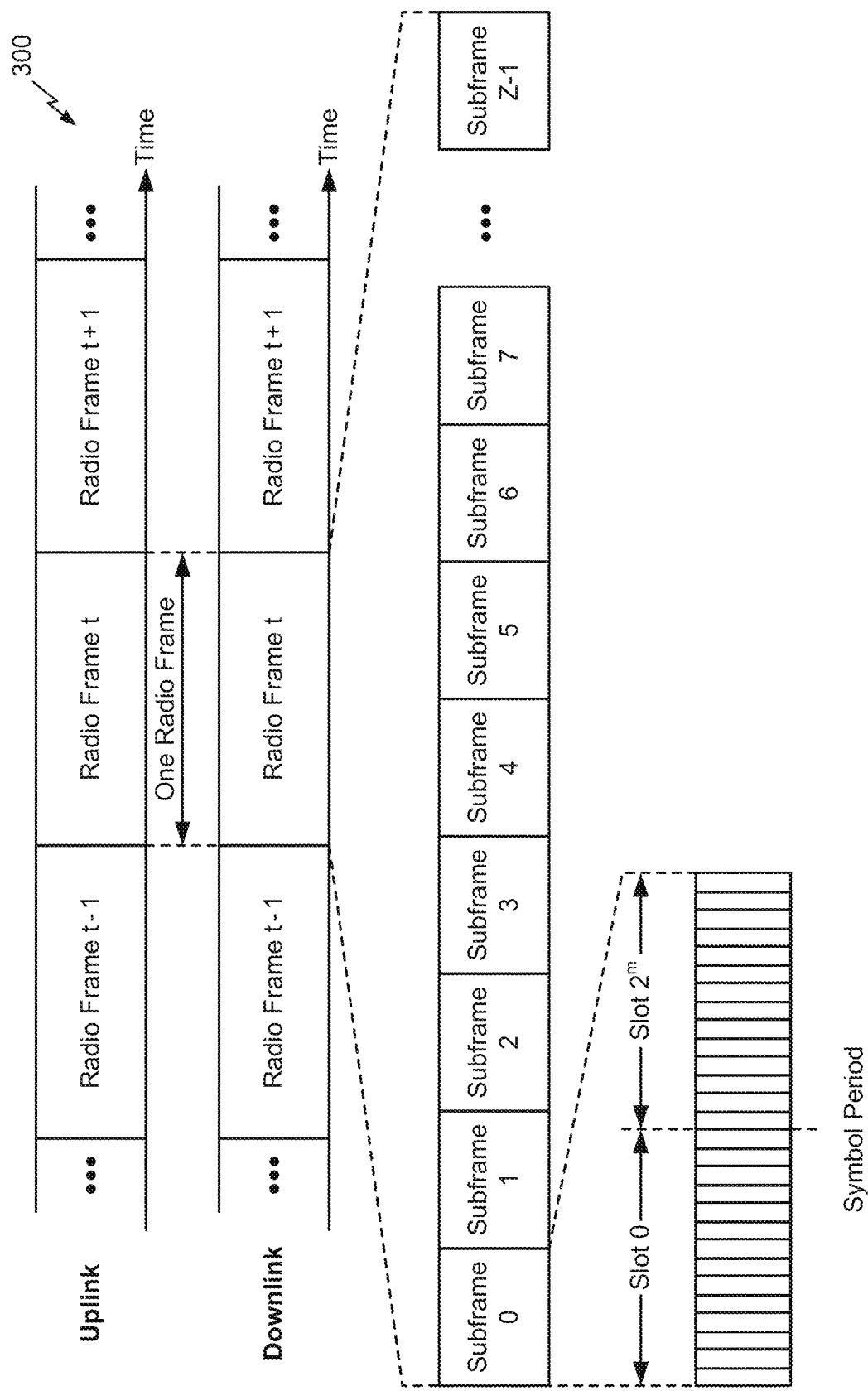
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
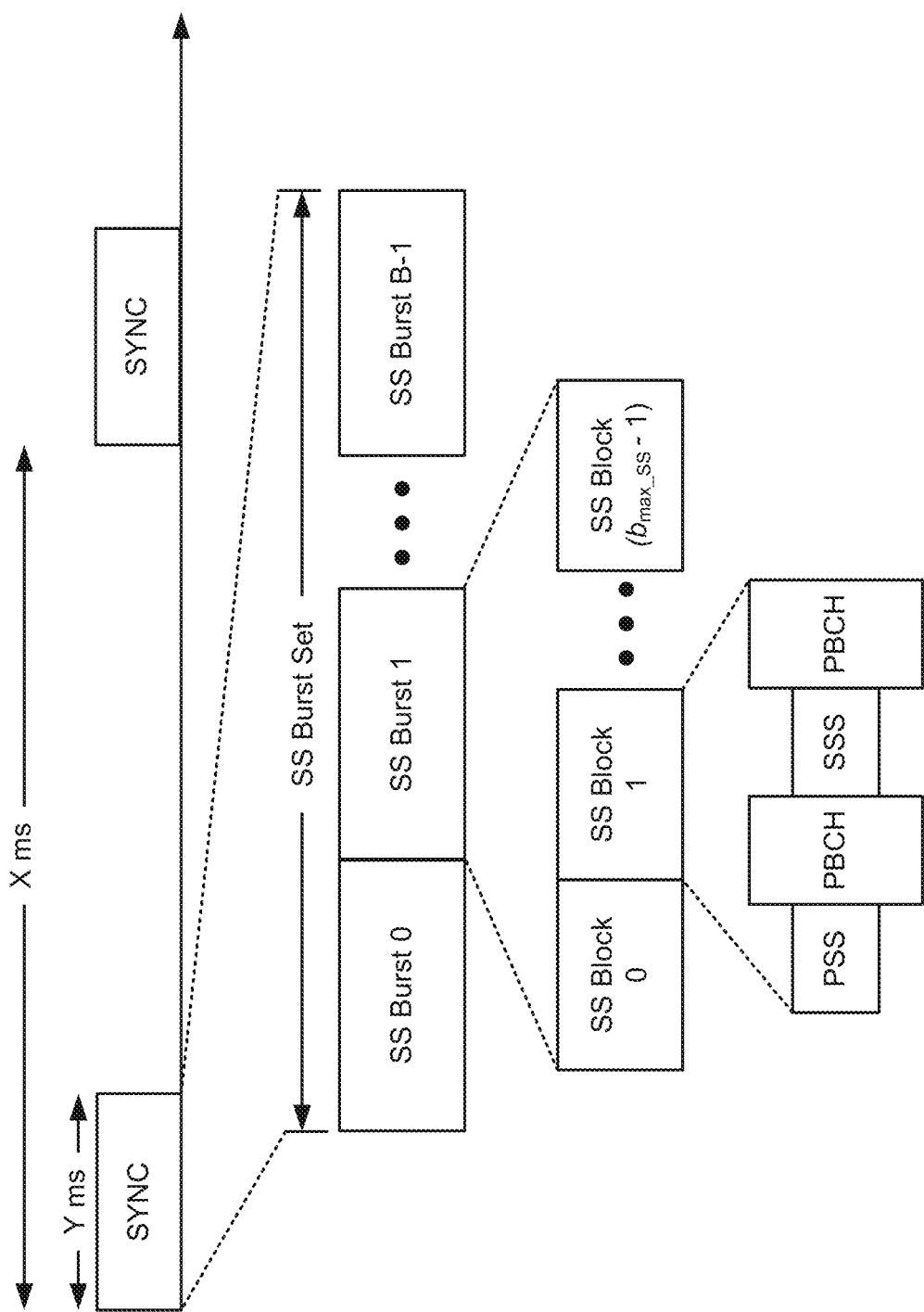
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
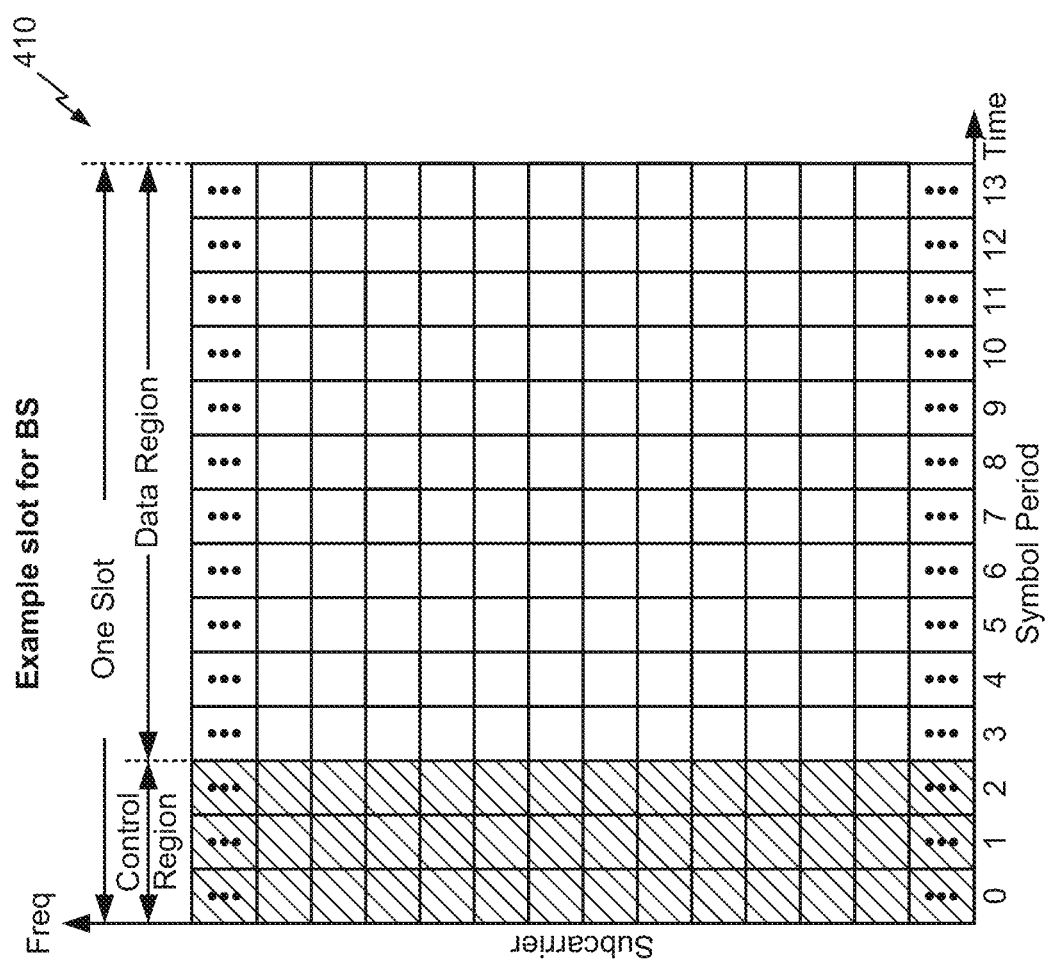
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
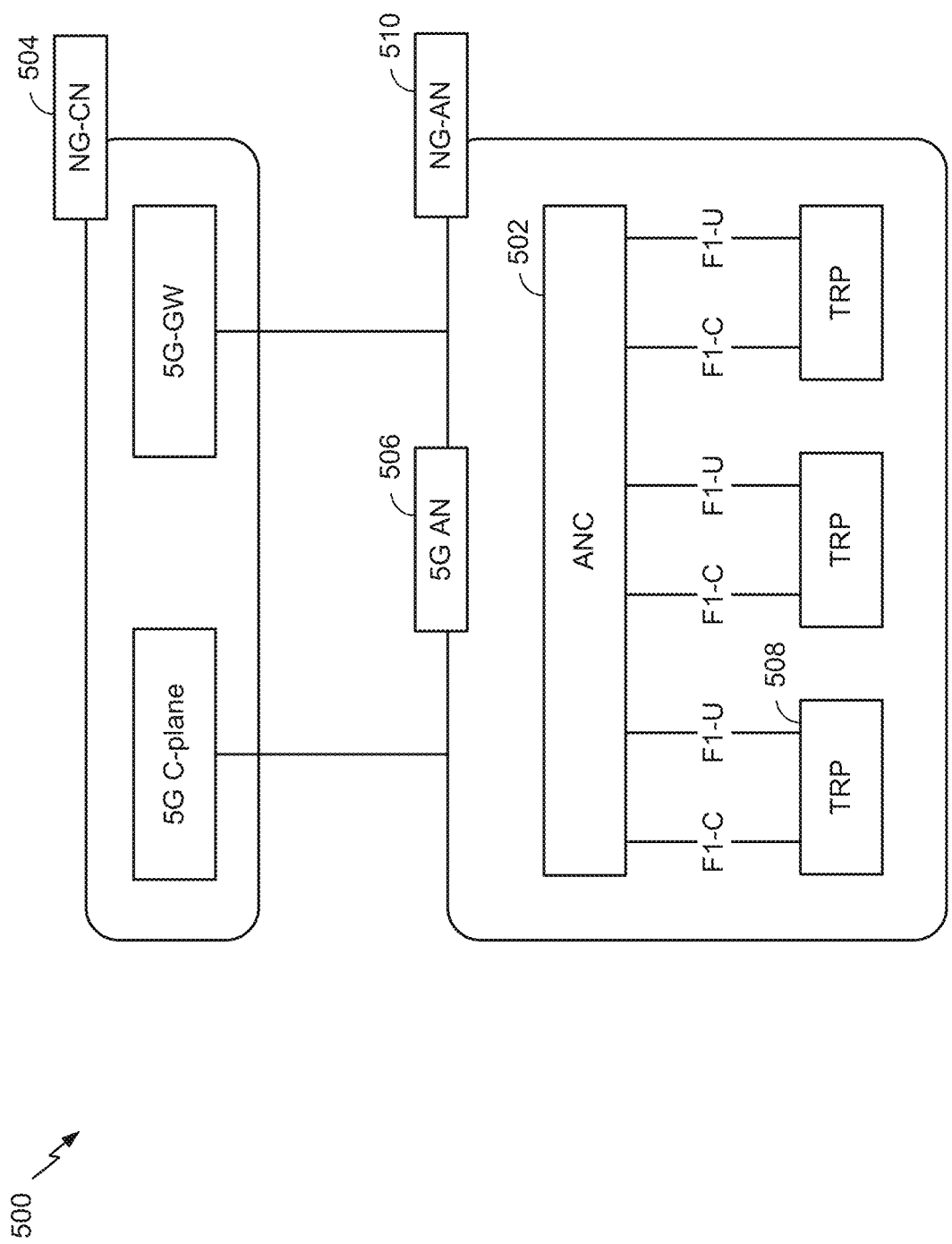
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
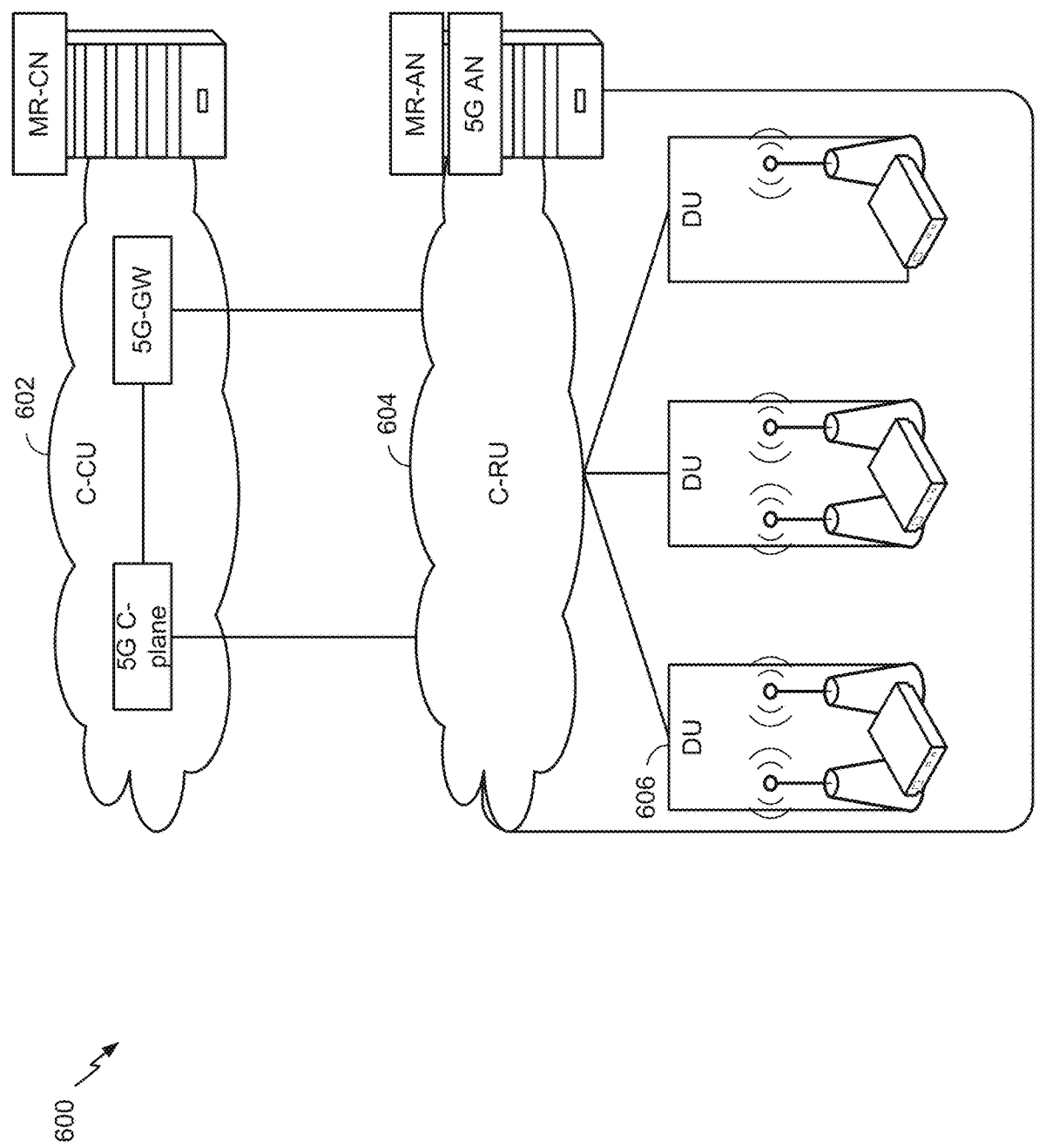
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as 5G, a UE may receive, from a BS, an indication of a configured grant. For example, the UE may receive a configuration message (e.g., a radio resource control (RRC) message) associated with indicating a set of resources that the UE is to use for a set physical uplink shared channel (PUSCH) transmissions. In this case, the UE may transmit a PUSCH communication, which may include a demodulation reference signal (DMRS) for channel estimation and a data transmission of payload data.

However, in some cases, the UE may not have data for transmission at a resource associated with a configured grant. Thus, some UEs may determine to transmit on the PUSCH without receiving a grant, which may be termed a grant-free transmission or a transmission with a configured grant. When the UE determines that a communication is to be transmitted (e.g., a packet is received by the UE at a media access control (MAC) layer), the UE may transmit a PUSCH communication at a transmission opportunity. In some cases, the BS may configure slot bundling or mini-slot bundling, and the UE may determine to transmit repetitions of the PUSCH communication at a plurality of transmission opportunities, thereby improving transmission reliability.

However, use of a common set of time resources, frequency resources, and/or the like by a plurality of UEs for unscheduled communication may result in an uplink transmission collision when two or more UEs attempt to transmit, concurrently, using a common frequency resource and time resource. As a result, the base station may receive a superposition of transmissions from two or more UEs.

A plurality of UEs may use orthogonal DMRS ports, which may be termed ports, to transmit DMRSs, thereby enabling uplink transmission collision detection and enabling a BS to identify which transmissions were transmitted by which UEs. Based at least in part on determining that a particular set of UEs were concurrently using a particular DMRS port for transmission, the BS may determine that the particular set of UEs have data for transmission, and may provide a re-transmission grant to each of the particular set of UEs, thereby enabling successful transmission. However, a quantity of orthogonal DMRS ports for a particular time resource and/or frequency resource may be limited, thereby limiting a quantity of UEs that can transmit on a particular network without causing excessive collisions. Therefore, if two or more UEs transmit concurrently on the same resource using the same DMRS port, the BS may not be able to detect particular UEs that have data for transmission.

Some aspects described herein may enable DMRS port hopping. For example, a UE may transmit a first transmission associated with a configured grant using a first DMRS port and may transmit a second transmission associated with a configured grant using a second DMRS port. In this way, a quantity of UEs that can be supported by a particular set of time resources and frequency resources may be increased relative to static DMRS port utilization, thereby improving utilization of network resources. Additionally, or alternatively, the techniques described herein may reduce a likelihood of two or more UEs transmitting concurrently on the same resource using the same DMRS port, thereby improving the reliability of uplink communication with configured grant.

Figure 7A:
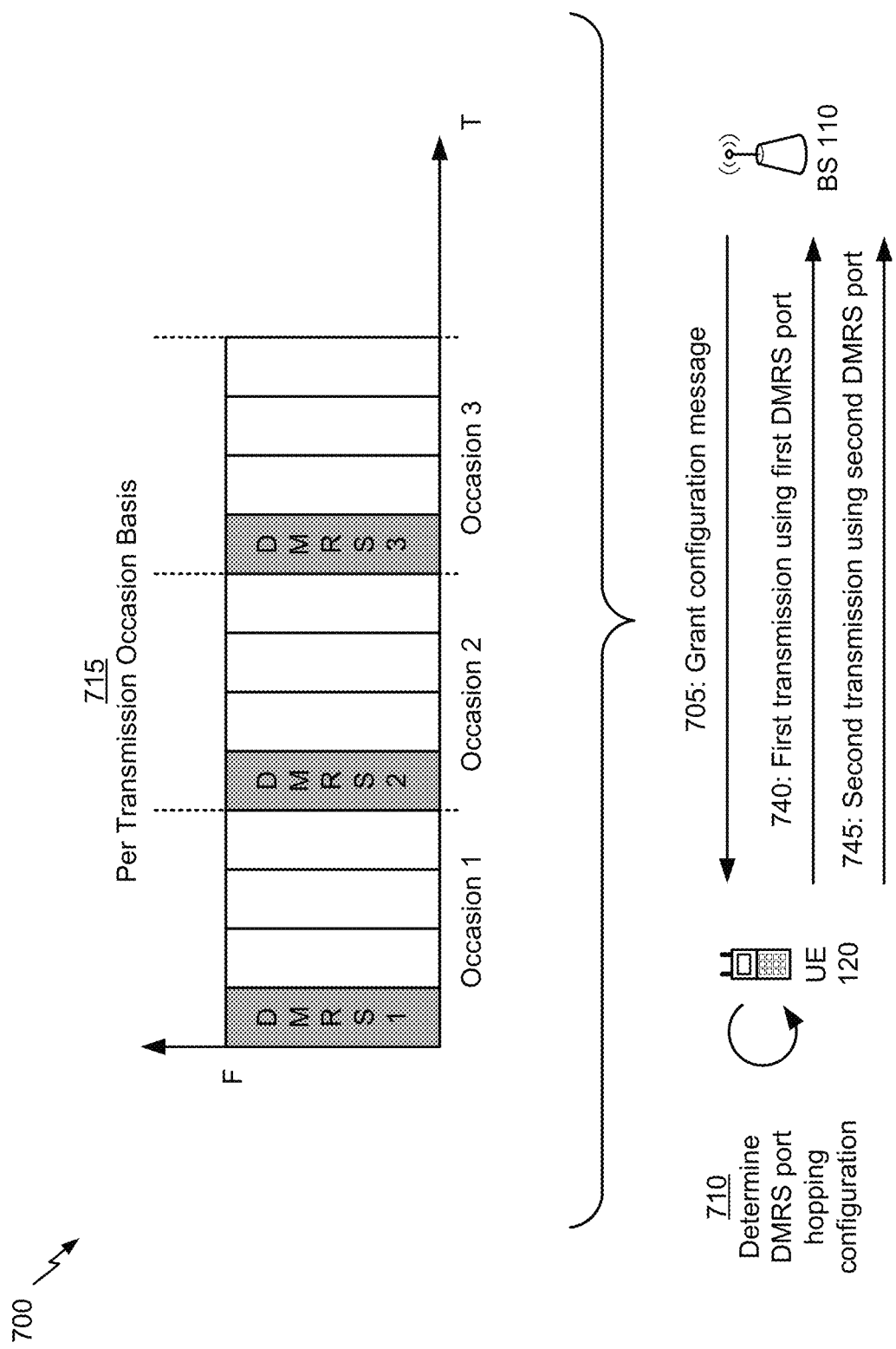

FIGS. 7A-7D are diagrams illustrating an example 700 of demodulation reference signal port hopping, in accordance with various aspects of the present disclosure. As shown in FIG. 7A, example 700 includes a BS 110 and a UE 120.

As further shown in FIG. 7A, and by reference number 705, UE 120 may receive, from BS 110, a configuration message including a grant for configuring a plurality of PUSCH transmissions. For example, BS 110 may provide a grant indicating that UE 120 is to use a particular time resource, frequency resource, DMRS port hopping configuration, and/or the like for transmission of the plurality of transmissions. In some aspects, UE 120 may receive a plurality of configuration messages identifying a plurality of configured grants. For example, UE 120 may receive a first uplink configured grant for a first uplink configured grant transmission, a second uplink configured grant for a second uplink configured grant transmission, and/or the like. In this case, UE 120 may determine a particular DMRS port hopping configuration, as described herein, based at least in part on an uplink configured grant index (e.g., based at least in part on an uplink configured grant relating to a DMRS transmission).

As further shown in FIG. 7A, and by reference number 710, UE 120 may determine a DMRS port hopping configuration. For example, as shown by reference number 715, UE 120 may determine to perform DMRS port hopping on a per transmission occasion basis. In this case, UE 120 may determine to use a first DMRS port (DMRS1) for a first transmission in a first transmission occasion, a second DMRS port (DMRS2) for a second transmission in a second transmission occasion, a third DMRS port (DMRS3) for a third transmission in a third transmission occasion, and/or the like.

In some aspects, UE 120 may determine a DMRS port to use for a transmission in a transmission occasion based at least in part on a user equipment identifier or a transmission occasion index (e.g., a grant-free PUSCH occasion index value) for the transmission occasion for which the DMRS port is to be used. For example, UE 120 may determine a set of DMRS ports to use for a sequence of PUSCH transmissions, and may determine the set of DMRS ports based at least in part on the user equipment identifier and a respective transmission occasion index for each transmission at each transmission occasion. In this way, UE 120 enables DMRS port hopping for grant-free PUSCH communication.

Figure 7B:
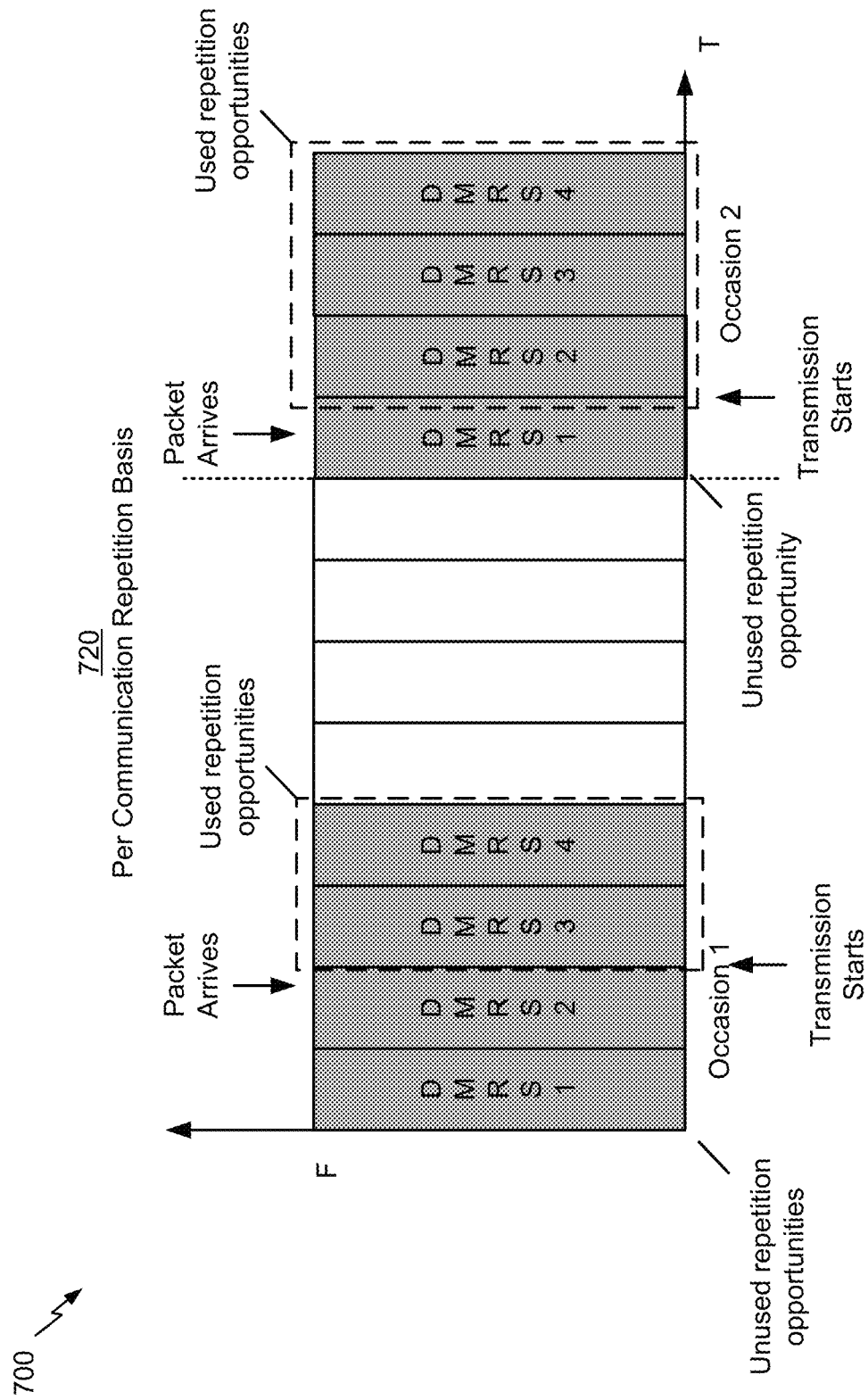

Additionally, or alternatively, as shown in FIG. 7B, and by reference number 720, UE 120 may determine to perform DMRS port hopping on a per communication repetition basis. For example, in a single transmission occasion (e.g., Occasion 1), UE 120 may determine to transmit a plurality of repetitions of a single communication (e.g., a packet), and may use a first DMRS port for a first transmission of the single communication and a second DMRS port for a second transmission (of a repetition) of the single communication. In this way, UE 120 enables DMRS port hopping within a single transmission occasion for grant-free PUSCH communication.

In some aspects, UE 120 may select a set of DMRS ports for the single transmission occasion based at least in part on a quantity of repetitions in the single transmission occasion. For example, when a transmission occasion is configured for 4 repetition opportunities (e.g., a transmission of a communication and 3 re-transmissions of the communication), which may correspond to 4 slots (or mini-slots) as shown, UE 120 may determine to use a set of 4 DMRS ports for the 4 repetition opportunities (e.g., DMRS1 for a first repetition opportunity, DMRS2 for a second repetition opportunity, DMRS3 for a third repetition opportunity, and DMRS4 for a fourth repetition opportunity).

In some aspects, UE 120 may select a DMRS port for utilization based at least in part on a repetition opportunity index rather than a repetition index. For example, as shown in the first transmission occasion, when a packet is generated at a MAC layer during a second repetition opportunity, UE 120 may schedule a first transmission in the third repetition opportunity, and may use the third DMRS port for the first transmission rather than the first DMRS port. Similarly, UE 120 may use the fourth DMRS port for a second transmission (e.g., a repetition of the first transmission) in the fourth repetition opportunity. Similarly, in the second transmission occasion where transmission is to start at the second repetition opportunity, UE 120 may use the second DMRS port, the third DMRS port, and the fourth DMRS port for a first transmission, a second transmission, and a third transmission, respectively.

Figure 7C:
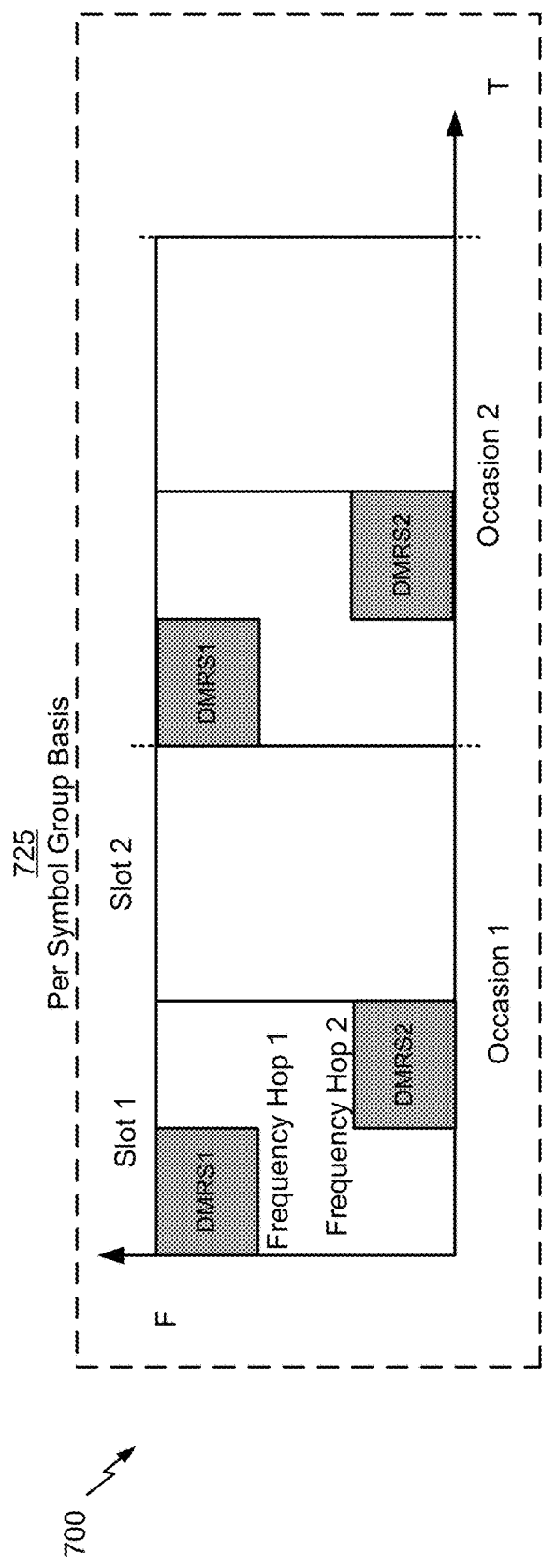
Figure 7C:
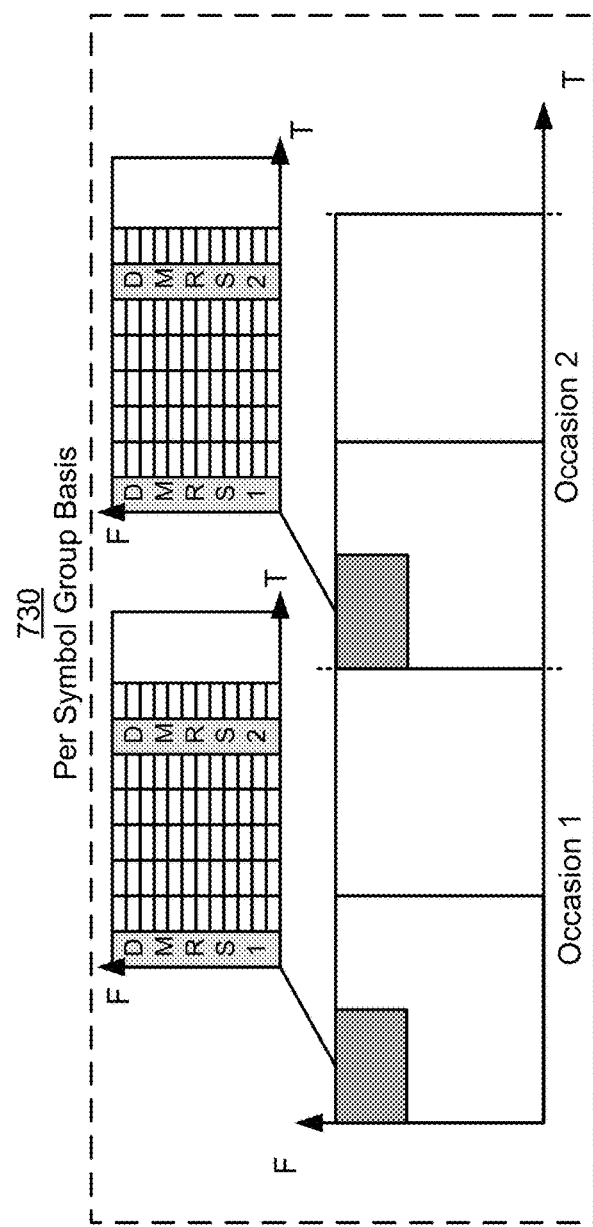

Additionally, or alternatively, as shown in FIG. 7C, and by reference number 725, UE 120 may determine to perform DMRS port hopping on a per symbol group basis. For example, when UE 120 is configured to perform frequency hopping (e.g., intra-slot or mini-slot frequency hopping), UE 120 may determine to use a first DMRS port (DMRS1) for a first frequency hop and for a first transmission and a second DMRS port (DMRS2) for a second frequency hop and for a second transmission in a single repetition opportunity. As shown by reference number 730, when UE 120 is not configured to perform frequency hopping and when a PUSCH communication includes a plurality of DMRS transmission locations (e.g., at a plurality of time resources), UE 120 may determine to use a first DMRS port for a first DMRS transmission location and a second DMRS port for a second DMRS transmission location in a single repetition opportunity. In this way, UE 120 enables DMRS port hopping within a single slot and/or repetition opportunity.

Additionally, or alternatively, as shown in FIG. 7D, and by reference number 735, UE 120 may determine to perform DMRS port hopping on a per resource block group basis. For example, for a bandwidth of a PUSCH divided into a set of resource block groups with each resource block group including a plurality of resource blocks, UE 120 may use a first DMRS port (Port 1000) in a first resource block group, a second DMRS port (Port 1001) in a second resource block group, a third DMRS port (Port 1002) in a third resource block group, a fourth DMRS port (Port 1003) in a fourth resource block group, and/or the like. In this case, each DMRS symbol of a set of DMRS symbols may support the 4 DMRS ports with orthogonality by using 2 code division multiplexed (CDM) DMRS ports and 2 frequency division multiplexed (FDM) DMRS ports within a single resource block. In this way, UE 120 enables DMRS port hopping for resource block groups within a DMRS symbol while maintaining orthogonality for DMRS ports within the DMRS symbol. In another example, a single DMRS symbol may support 6 DMRS ports using, for example, CDM techniques.

In some aspects, a plurality of DMRS ports may form a CDM group. For example, a particular DMRS configuration may support 2 DMRS ports on a single comb, and may support 4 DMRS ports on the same DMRS symbol using 2 CDM groups and 2 combs (each including 2 DMRS ports).

In some aspects, UE 120 may determine to perform DMRS port hopping on a plurality of bases (e.g., two bases, three bases, four bases, and/or the like), and may separately configure each DMRS port hopping basis. For example, UE 120 may determine to perform DMRS port hopping on a per transmission occasion basis and a per communication repetition basis. In this case, for the per transmission occasion basis, UE 120 may determine to perform DMRS port hopping based at least in part on an index of the transmission occasion, and for the per communication repetition basis, UE 120 may determine to perform DMRS port hopping based at least in part on a configured per communication repetition port hopping pattern and an index of a repetition opportunity. As an example, UE 120 may be configured with a DMRS port hopping pattern, e.g., a DMRS port sequence {DMRS0, DMRS1, DMRS2, and DMRS3} for the per communication repetition basis, and may initialize the DMRS port sequence for each transmission occasion as follows: in a first transmission occasion, index 1, with a set of 4 sequential repetition opportunities, UE 120 may determine to use a sequence of DMRS ports starting with index 0, {DMRS0, DMRS1, DMRS2, and DMRS3} mod 4, resulting in the sequence of DMRS ports being {DMRS0, DMRS1, DMRS2, and DMRS3} for the 4 sequential repetition opportunities, respectively. Further, for a second transmission occasion, index 2, UE 120 may determine the sequence starting with index 2 as {DMRS2, DMRS3, DMRS4, and DMRS5} mod 4 to determine the sequence for a second transmission occasion, resulting in a sequence of DMRS ports {DMRS2, DMRS3, DMRS0, DMRS1} for the second transmission occasion (e.g., in this case, DMRS5 mod 4 may result in selection of DMRS1). In this way, UE 120 may utilize a plurality of DMRS port hopping schemes for port hopping.

In some aspects, UE 120 may schedule different DMRS ports for different DMRS tones. For example, UE 120 may schedule DMRS0 and DMRS1 on even indexed DMRS tones and DMRS2 and DMRS3 on odd indexed DMRS tones. In this case, DMRS0 and DMRS1 may form a first CDM group 0 and DMRS2 and DMRS3 may form a second CDM group 1. As another example, when a DMRS configuration supports 6 DMRS ports on a single DMRS symbol, a third CDM group may be formed from fifth and sixth DMRS ports (e.g., DMRS4 and DMRS5, respectively).

In some aspects, UE 120 may receive an indication of CDM groups that are to be occupied by other UEs, such as for multiple-user, multiple-input, multiple-output (MU-MIMO) operation. For example, BS 110 may indicate a DMRS port index and may indicate that, for example, that UE 120 is to use a DMRS port in the first CDM group and may indicate one or more reserve frequencies and/or tones corresponding to a second CDM group is to be used by other UEs and not by UE 120 for a particular DMRS or PUSCH transmission. In this case, UE 120 may not transmit a PUSCH on tones of the second CDM, which may enable the other UEs to transmit other DMRSs on tones of the second CDM group. In some aspects BS 110 may indicate that the second CDM group is not to be used by UE 120 or other UEs for DMRS transmissions and UE 120 may rate match a PUSCH around the second CDM group.

In some aspects, BS 110 may provide and UE 120 may receive a CDM group indication using a particular signaling. For example, BS 110 may indicate CDM groups occupied by each UE and for each PUSCH transmission associated with a configured grant. In this case, UE 120 may rate-match a PUSCH around indicated CDM groups. Further, when performing DMRS port hopping, UE 120 may limit which DMRS ports are selected to DMRS ports included in indicated CDM groups (e.g., UE 120 may avoid DMRS ports associated with non-indicated CDM groups). In some aspects, BS 110 may indicate CDM groups for a particular configured grant transmission (e.g., a sequentially first configured grant transmission). In this case, UE 120 may determine which CDM groups are occupied for each subsequent PUSCH transmission and select DMRS ports based on the occupied CDM groups and the non-indicated DMRS ports. In some aspects, UE 120 may rate-match a PUSCH around a set of determined CDM groups (e.g., including one or more CDM groups that are not indicated for use in connection with a particular configured grant transmission occasion). In some aspects, BS 110 may indicate a particular set of CDM groups and UE 120 may rate match around all CDM groups (e.g., UE 120 may forgo transmitting a PUSCH using DMRS symbols).

In some aspects, UE 120 may determine to perform DMRS port hopping on a plurality of bases, and may jointly configure all DMRS port hopping bases. For example, UE 120 may determine a DMRS port based at least in part on a user equipment identifier, a DMRS location value, and a resource block group index value, thereby resulting in DMRS port hopping being performed, concurrently, on a per transmission occasion basis, a per communication repetition basis, a per symbol group basis, and a per resource block group basis. As another example, UE 120 may determine a DMRS port for a set of transmissions based at least in part on a user equipment identifier and a slot index or mini-slot index, thereby enabling DMRS port hopping to be performed, concurrently, on a per transmission occasion basis and a per communication repetition basis (and not on a per symbol group basis or a per resource block group basis).

In some aspects, UE 120 may determine to perform DMRS port hopping for a set of multiple-input multiple-output (MIMO) transmissions. In this case, each MIMO transmission may be associated with a plurality of DMRS ports, and DMRS port hopping may be performed. For example, UE 120 may determine a first DMRS port and a second DMRS port for concurrent use for a first transmission, and may determine to DMRS port hop to a third DMRS port and a fourth DMRS port, respectively, for concurrent use for a second transmission. In this case, UE 120 and BS 110 may use the first DMRS port and the third DMRS port for channel estimation of a first spatial layer for the first transmission and the second transmission, respectively, and the second DMRS port and the fourth DMRS port for channel estimation of a second spatial layer for the first transmission and the second transmission, respectively.

In some aspects, UE 120 may use a single DMRS port hopping configuration for all DMRS ports. For example, UE 120 may perform DMRS port hopping on a per transmission occasion basis for a DMRS port hop from the first DMRS port to the third DMRS port and for a DMRS port hop from the second DMRS port to the fourth DMRS port. Additionally, or alternatively, UE 120 may perform DMRS port hopping on a per transmission occasion basis for a DMRS port hop from the first DMRS port to the third DMRS port, and may perform DMRS port hopping on a per communication repetition basis for a DMRS port hop from the second DMRS port to the fourth DMRS port. Additionally, or alternatively, UE 120 may perform DMRS port hopping on a per transmission occasion basis for a DMRS port hop from the first DMRS port to the third DMRS port for the first spatial layer and may not perform DMRS port hopping for the second spatial layer (e.g., the second DMRS port and the fourth DMRS port may be a common DMRS port).

Returning to FIG. 7A, and as shown by reference number 740, UE 120 may transmit a first transmission using a first DMRS port. For example, using the first DMRS port, UE 120 may transmit the first transmission, which may include a first DMRS and first payload data for communication to B S 110. In some aspects, UE 120 may transmit the first transmission in a single repetition opportunity of a transmission occasion, in a group of symbols of the single repetition opportunity of the transmission occasion, in a resource block group of resource blocks of a group of symbols of a single repetition of the transmission occasion, and/or the like.

As further shown in FIG. 7A, and by reference number 745, UE 120 may transmit a second transmission, which is associated with a same configured grant as the first transmission, using a second DMRS port. For example, using the second DMRS port, UE 120 may transmit the second transmission, which may include a second DMRS and second payload data for communication to BS 110. In this case, UE 120 may transmit the second transmission in a different transmission occasion than for the first transmission. Additionally, or alternatively, UE 120 may transmit the second transmission in a different repetition opportunity of a same transmission occasion as for the first transmission. Additionally, or alternatively, UE 120 may transmit the second transmission in a different group of symbols (e.g., a different frequency hop or DMRS location) of a same repetition opportunity as for the first transmission. Additionally, or alternatively, UE 120 may transmit the second transmission in a different resource block group of a same group of symbols as for the first transmission. In this way, UE 120 enables DMRS port hopping for grant-free PUSCH communication.

In some aspects, BS 110 may receive the first transmission and the second transmission. For example, based at least in part on providing configuration information configuring a particular DMRS port hopping configuration for UE 120, BS 110 may receive transmissions from UE 120, and may detect the particular DMRS port hopping configuration to identify UE 120. In this case, based at least in part on identifying UE 120 and determining a transmission collision, BS 110 may provide a retransmission grant to enable UE 120 to retransmit a colliding transmission, and UE 120 may retransmit the colliding transmission using resources associated with the retransmission grant.

As indicated above, FIGS. 7A-7D are provided as examples. Other examples may differ from what is described with respect to FIGS. 7A-7D.

Figure 8:
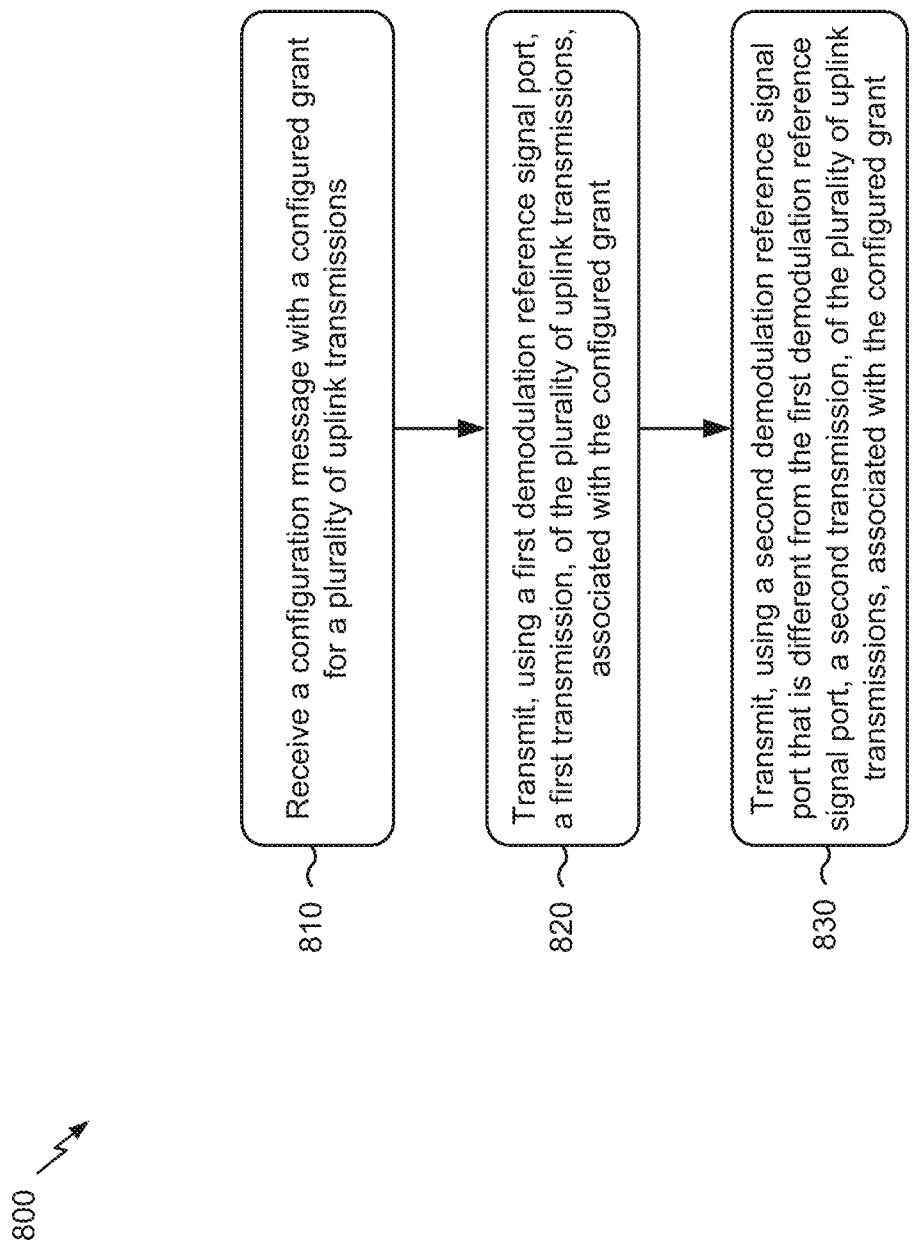
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs demodulation reference signal port hopping.

As shown in FIG. 8, in some aspects, process 800 may include receiving a configuration message with a configured grant for a plurality of uplink transmissions (block 810). For example, the UE (e.g., using antenna 252, DEMOD 254, MIMO detector 256, receive processor 258, controller/processor 280, and/or the like) may receive the configuration message with the configured grant for the plurality of uplink transmissions, as described in more detail above.

As shown in FIG. 8, in some aspects, process 800 may include transmitting, using a first demodulation reference signal port, a first transmission, of the plurality of uplink transmissions, associated with the configured grant (block 820). For example, the UE (e.g., using controller/processor 280, transmit processor 264, TX MIMO processor 266, MOD 254, antenna 252, and/or the like) may transmit using the first demodulation reference signal port, the first transmission, of the plurality of uplink transmissions, associated with the configured grant, as described in more detail above.

As shown in FIG. 8, in some aspects, process 800 may include transmitting, using a second demodulation reference signal port that is different from the first demodulation reference signal port, a second transmission, of the plurality of uplink transmissions, associated with the configured grant (block 830). For example, the UE (e.g., using controller/processor 280, transmit processor 264, TX MIMO processor 266, MOD 254, antenna 252, and/or the like) may transmit, using the second demodulation reference signal port that is different from the first demodulation reference signal port, the second transmission, of the plurality of uplink transmissions, associated with the configured grant, as described in more detail above.

Process 800 may include additional aspects, such as any single aspect or any combination of aspects described below and/or in connection with one or more other processes described elsewhere herein.

In a first aspect, the first transmission includes a first demodulation reference signal associated with the first demodulation reference signal port and the second transmission includes a second demodulation reference signal associated with the second demodulation reference signal port.

In a second aspect, alone or in combination with the first aspect, the first transmission includes first payload data and the second transmission includes second payload data.

In a third aspect, alone or in combination with one or more of the first and second aspects, the first transmission includes a first communication and the UE is configured to transmit the first transmission in a first transmission occasion. In some aspects, the second transmission includes a second communication that is different from the first communication and that is different from the first transmission occasion and the UE is configured to transmit the second transmission in a second transmission occasion.

In a fourth aspect, alone or in combination with one or more of the first through third aspects, the UE is configured to determine at least one of the first demodulation reference signal port or the second demodulation reference signal port based at least in part on a user equipment identifier, and in part on at least one of a configured grant occasion index, a repetition opportunity index, a slot index, a mini-slot index, a symbol index, a DMRS location index, a resource block group index, or an uplink configured grant index.

In a fifth aspect, alone or in combination with one or more of the first through fourth aspects, the first transmission is a particular communication and the UE is configured to transmit the first transmission in a particular transmission occasion. In some aspects, the second transmission is a repetition of the particular communication and the UE is configured to transmit the second transmission in the particular transmission occasion.

In a sixth aspect, alone or in combination with one or more of the first through fifth aspects, the UE is configured to transmit the first transmission in a first slot or mini-slot and the second transmission in a second slot or mini-slot that is different from the first slot or mini-slot.

In a seventh aspect, alone or in combination with one or more of the first through sixth aspects, the UE is configured to transmit the first transmission using a first portion of a physical uplink shared channel transmission and the second transmission using a second portion of the physical uplink shared channel transmission that is different from the first portion of the physical uplink shared channel transmission.

In an eighth aspect, alone or in combination with one or more of the first through seventh aspects, the first portion is a first one or more symbols and the second portion is a second one or more symbols.

In a ninth aspect, alone or in combination with one or more of the first through eighth aspects, the first portion is associated with a first frequency and the second portion is associated with a second frequency that is different than the first frequency.

In a tenth aspect, alone or in combination with one or more of the first through ninth aspects, the first portion is associated with a first demodulation reference signal in a particular slot of a transmission occasion and the second portion is associated with a second demodulation reference signal in the particular slot of the transmission occasion.

In an eleventh aspect, alone or in combination with one or more of the first through tenth aspects, the UE is configured to transmit the first transmission during a first one or more resource blocks of a slot and the second transmission during a second one or more resource blocks of the slot that is different than the first one or more resource blocks of the slot.

In a twelfth aspect, alone or in combination with one or more of the first through eleventh aspects, the UE is configured to determine a selected set of demodulation reference signal ports, which includes the first demodulation reference signal port and the second demodulation reference signal port, based at least in part on a quantity of repetitions of a physical uplink shared channel within a transmission occasion.

In a thirteenth aspect, alone or in combination with one or more of the first through twelfth aspects, the UE is configured to select the selected set of demodulation reference signal ports based at least in part on a repetition opportunity index.

In a fourteenth aspect, alone or in combination with one or more of the first through thirteenth aspects, the configuration message configures a set of demodulation reference signal ports, which includes the first demodulation reference signal port and the second demodulation reference signal port, and where a quantity of demodulation reference signal ports is selected based at least in part on a repetition parameter such that each demodulation reference signal port, of the set of demodulation reference signal ports, corresponds to a repetition occasion.

In a fifteenth aspect, alone or in combination with one or more of the first through fourteenth aspects, the first demodulation reference signal port is associated with a first demodulation reference signal pattern and the second demodulation reference signal port is associated with a second demodulation reference signal pattern that is different than the first demodulation reference signal pattern.

In a sixteenth aspect, alone or in combination with one or more of the first through fifteenth aspects, the UE is configured to perform demodulation reference signal port hopping to use a plurality of demodulation reference signal ports concurrently on two or more bases of: a per transmission occasion basis, a per communication repetition basis, a per symbol group basis, or a per resource block group basis.

In a seventeenth aspect, alone or in combination with one or more of the first through sixteenth aspects, the UE is configured to separately determine a demodulation reference signal hopping configuration for each of the two or more bases and to apply each separately determined demodulation reference signal hopping configuration to a corresponding basis.

In an eighteenth aspect, alone or in combination with one or more of the first through seventeenth aspects, the UE is configured to jointly determine a demodulation reference signal hopping configuration for all of the two or more bases.

In a nineteenth aspect, alone or in combination with one or more of the first through eighteenth aspects, the first transmission is a first multiple-input multiple-output transmission and the first demodulation reference signal port is a first port and a second port and the second transmission is a second multiple-input multiple-output transmission and the second demodulation reference signal port is a third port and a fourth port.

In a twentieth aspect, alone or in combination with one or more of the first through nineteenth aspects, the UE is configured to determine a hop from the first port to the third port using a particular hopping configuration and from the second port to the fourth port using the particular hopping configuration.

In a twenty first aspect, alone or in combination with one or more of the first through twentieth aspects, the UE is configured to determine a hop from the first port to the third port using a first hopping configuration and from the second port to the fourth port using a second hopping configuration that is different from the first hopping configuration.

In a twenty second aspect, alone or in combination with one or more of the first through twenty first aspects, the UE is configured to forgo transmitting using at least one demodulation reference signal port to enable one or more other UEs to transmit using the at least one demodulation reference signal port. For example, the UE may forgo transmitting a DMRS on a DMRS port or may forgo transmitting a PUSCH on a DMRS ports.

In a twenty third aspect, alone or in combination with one or more of the first through twenty second aspects, the UE is configured to transmit a physical uplink shared channel using one or more other demodulation reference signal ports.

In a twenty fourth aspect, alone or in combination with one or more of the first through twenty third aspects, the first port and the third port are different ports and the second port and the fourth port are different ports.

In a twenty fifth aspect, alone or in combination with one or more of the first through twenty fourth aspects, the first port and the third port are different ports and the second port and the fourth port are a common port.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
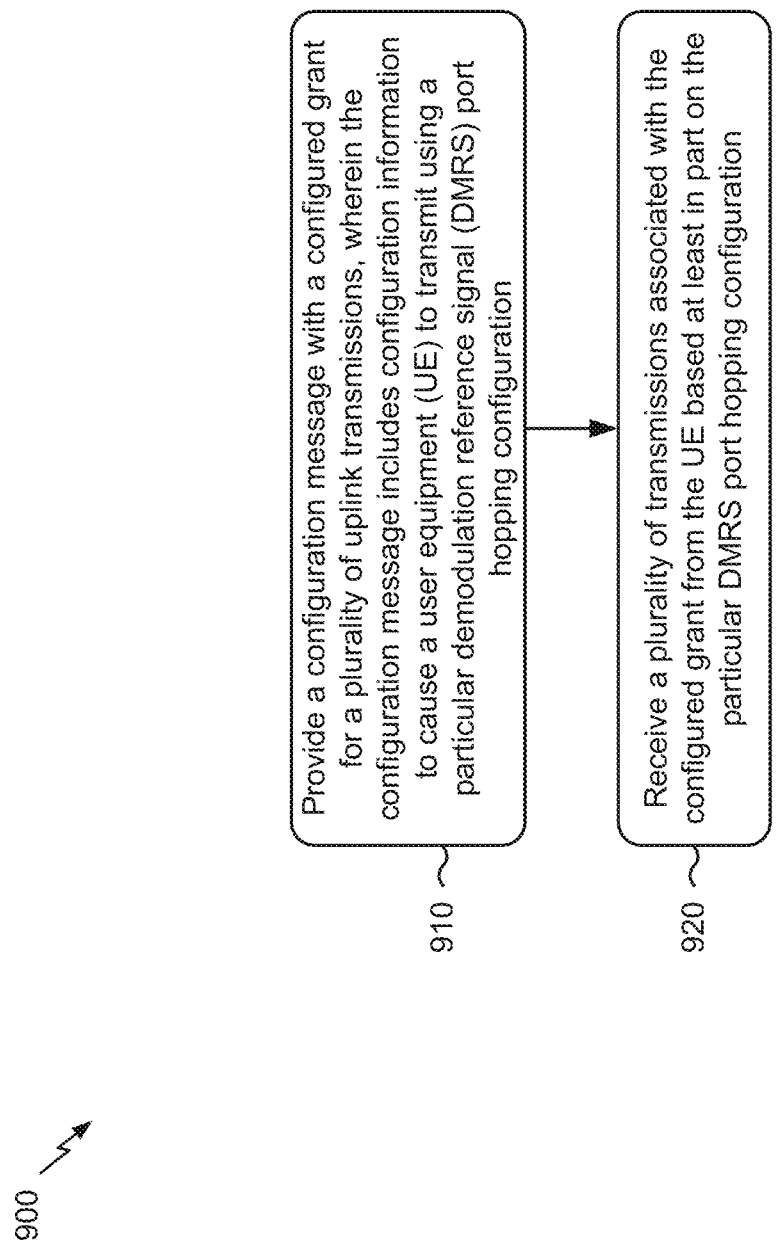
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs demodulation reference signal port hopping.

As shown in FIG. 9, in some aspects, process 900 may include providing a configuration message with a configured grant for a plurality of uplink transmissions, wherein the configuration message includes configuration information to cause a user equipment (UE) to transmit using a particular demodulation reference signal (DMRS) port hopping configuration (block 910). For example, the BS (e.g., using controller/processor 240, transmit processor 220, TX MIMO processor 230, MOD 232, antenna 234, and/or the like) may provide a configuration message with a configured grant for a plurality of uplink transmissions, as described in more detail above. In some aspects, the configuration message includes configuration information to cause a user equipment (UE) to transmit using a particular demodulation reference signal (DMRS) port hopping configuration.

As shown in FIG. 9, in some aspects, process 900 may include receiving a plurality of transmissions associated with the configured grant from the UE based at least in part on the particular DMRS port hopping configuration (block 920). For example, the BS (e.g., using antenna 234, DEMOD 232, MIMO detector 236, receive processor 238, controller/processor 240, and/or the like) may receive a plurality of transmissions associated with the configured grant from the UE based at least in part on the particular DMRS port hopping configuration, as described in more detail above.

Process 900 may include additional aspects, such as any single aspect or any combination of aspects described below and/or in connection with one or more other processes described elsewhere herein.

In a first aspect, the BS is configured to receive a first transmission, of the plurality of transmissions, associated with the configured grant and transmitted using a first DMRS port. In some aspects, the BS is configured to receive a second transmission, of the plurality of transmissions, associated with the configured grant and transmitted using a second DMRS port that is different from the first DMRS port.

In a second aspect, alone or in combination with the first aspect, the BS is configured to identify the UE based at least in part on receiving the plurality of transmissions and based at least in part on the particular DMRS port hopping configuration.

In a third aspect, alone or in combination with one or more of the first and second aspects, the BS is configured to provide a retransmission grant for a transmission of the plurality of transmissions based at least in part on the particular DMRS port hopping configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration message with a configured grant for a plurality of uplink transmissions of a single communication;
   selecting, based at least in part on a quantity of the plurality of uplink transmissions, a plurality of demodulation reference signal ports, corresponding to a plurality of repetition opportunities of the single communication, for a single transmission occasion associated with transmitting the single communication;
   selecting, based at least in part on a demodulation reference signal port hopping configuration, a first demodulation reference signal port, of the plurality of demodulation reference signal ports and corresponding to a first repetition opportunity of the plurality of repetition opportunities, to transmit a first transmission of the plurality of uplink transmissions, and a second demodulation reference signal port, of the plurality of demodulation reference signal ports and corresponding to a second repetition opportunity of the plurality of repetition opportunities, to transmit a second transmission of the plurality of uplink transmissions; and
   transmitting, based at least in part on the demodulation reference signal port hopping configuration, the first transmission, using the first demodulation reference signal port and in the first repetition opportunity, and the second transmission, using the second demodulation reference signal port and in the second repetition opportunity.

2. The method of claim 1, wherein the first transmission includes a first demodulation reference signal associated with the first demodulation reference signal port and the second transmission includes a second demodulation reference signal associated with the second demodulation reference signal port.

3. The method of claim 2, wherein the first transmission includes first payload data and the second transmission includes second payload data.

4. The method of claim 1, wherein the first transmission includes a first communication and the second transmission includes a second communication that is different from the first communication.

5. The method of claim 1, further comprising:
   selecting the first demodulation reference signal port and the second demodulation reference signal port based at least in part on at least one of a UE identifier, a configured grant occasion index, a repetition opportunity index, a slot index, a mini-slot index, a symbol index, a demodulation reference signal location index, a resource block group index, or an uplink configured grant index.

6. The method of claim 1, wherein the first transmission is a particular communication and the second transmission is a repetition of the particular communication.

7. The method of claim 1, wherein the first transmission is transmitted in a first slot or mini-slot and the second transmission is transmitted in a second slot or mini-slot that is different from the first slot or mini-slot.

8. The method of claim 1, wherein the first transmission is transmitted using a first portion of a physical uplink shared channel transmission and the second transmission is transmitted using a second portion of the physical uplink shared channel transmission that is different from the first portion of the physical uplink shared channel transmission.

9. The method of claim 8, wherein the first portion is a first one or more symbols and the second portion is a second one or more symbols.

10. The method of claim 8, wherein the first portion is associated with a first frequency and the second portion is associated with a second frequency that is different than the first frequency.

11. The method of claim 8, wherein the first portion is associated with a first demodulation reference signal in a particular slot of a transmission occasion and the second portion is associated with a second demodulation reference signal in the particular slot of the transmission occasion.

12. The method of claim 1, wherein the first transmission is transmitted during a first one or more resource blocks of a slot and the second transmission is transmitted during a second one or more resource blocks of the slot that is different than the first one or more resource blocks of the slot.

13. The method of claim 1, wherein the first demodulation reference signal port and the second demodulation reference signal port are further selected based at least in part on a repetition opportunity index.

14. The method of claim 1, wherein the configuration message configures the plurality of demodulation reference signal ports.

15. The method of claim 1, wherein the first demodulation reference signal port is associated with a first demodulation reference signal pattern and the second demodulation reference signal port is associated with a second demodulation reference signal pattern that is different than the first demodulation reference signal pattern.

16. The method of claim 1, wherein the demodulation reference signal port hopping configuration is associated with two or more bases of:
   a per transmission occasion basis,
   a per communication repetition basis,
   a per symbol group basis, or
   a per resource block group basis.

17. The method of claim 16, further comprising:
   separately determining the demodulation reference signal hopping configuration for each of the two or more bases; and
   applying each separately determined demodulation reference signal hopping configuration to a corresponding basis.

18. The method of claim 16, further comprising:
jointly the demodulation reference signal hopping configuration for all of the two or more bases.

19. The method of claim 1, wherein:
the first transmission is a first multiple-input multiple-output transmission,
the first demodulation reference signal port is a first port and a second port,
the second transmission is a second multiple-input multiple-output transmission, and
the second demodulation reference signal port is a third port and a fourth port.

20. The method of claim 19, further comprising:
determining, based at least in part on the demodulation reference signal port hopping configuration, to perform a hop from the first port to the third port and from the second port to the fourth port.

21. The method of claim 1, further comprising:
foregoing transmitting using resources associated with a third demodulation reference signal port to enable one or more other UEs to transmit using the third demodulation reference signal port.

22. A user equipment (UE) for wireless communication, comprising:
a memory; and
one or more processors coupled with the memory, the one or more processors configured to:
receive a configuration message with a configured grant for a plurality of uplink transmissions of a single communication;
select based at least in part on a quantity of the plurality of uplink transmissions, a plurality of demodulation reference signal ports, corresponding to a plurality of repetition opportunities of the single communication, for a single transmission occasion associated with transmitting the single communication;
select, based at least in part on a demodulation reference signal port hopping configuration, a first demodulation reference signal port, of the plurality of demodulation reference signal ports and corresponding to a first repetition opportunity of the plurality of repetition opportunities, to transmit a first transmission of the plurality of uplink transmissions, and a second demodulation reference signal port, of the plurality of demodulation reference signal ports and corresponding to a second repetition opportunity of the plurality of repetition opportunities, to transmit a second transmission of the plurality of uplink transmissions; and
transmit, based at least in part on the demodulation reference signal port hopping configuration, the first transmission, using the first demodulation reference signal port and in the first repetition opportunity, and the second transmission, using the second demodulation reference signal port and in the second repetition opportunity.

23. The UE of claim 22, wherein the first transmission includes a first demodulation reference signal associated with the first demodulation reference signal port and the second transmission includes a second demodulation reference signal associated with the second demodulation reference signal port.

24. An apparatus for wireless communication, comprising:
means for receiving a configuration message with a configured grant for a plurality of uplink transmissions of a single communication;
means for selecting, based at least in part on a quantity of the plurality of uplink transmissions, a plurality of demodulation reference signal ports, corresponding to a plurality of repetition opportunities of the single communication, for a single transmission occasion associated with transmitting the single communication;
means for selecting, based at least in part on a demodulation reference signal port hopping configuration and a repetition opportunity index associated with the plurality of repetition opportunities, a first demodulation reference signal port, of the plurality of demodulation reference signal ports and corresponding to a first repetition opportunity of the plurality of repetition opportunities, to transmit a first transmission of the plurality of uplink transmissions, and a second demodulation reference signal port, of the plurality of demodulation reference signal ports and corresponding to a second repetition opportunity of the plurality of repetition opportunities, to transmit a second transmission of the plurality of uplink transmissions; and
means for transmitting, based on the demodulation reference signal port hopping configuration, the first transmission, using the first demodulation reference signal port and in the first repetition opportunity, and the second transmission, using the second demodulation reference signal port, and in the second repetition opportunity.

25. The apparatus of claim 24, wherein the first transmission is transmitted using a first portion of a physical uplink shared channel transmission and the second transmission is transmitted using a second portion of the physical uplink shared channel transmission that is different from the first portion of the physical uplink shared channel transmission.

26. A non-transitory computer-readable medium storing a set of instructions for wireless communication, the set of instructions comprising:
one or more instructions that, when executed by one or more processors of a user equipment (UE), cause the UE to:
receive a configuration message with a configured grant for a plurality of uplink transmissions of a single communication;
select, based at least in part on a quantity of the plurality of uplink transmissions, a plurality of demodulation reference signal ports, corresponding to a plurality of repetition opportunities of the single communication, for a single transmission occasion associated with transmitting the single communication;
select, based at least in part on a demodulation reference signal port hopping configuration, a first demodulation reference signal port, of the plurality of demodulation reference signal ports and corresponding to a first repetition opportunity of the plurality of repetition opportunities, to transmit a first transmission of the plurality of uplink transmissions, and a second demodulation reference signal port, of the plurality of demodulation reference signal ports and corresponding to a second repetition opportunity of the plurality of repetition opportunities, to transmit a second transmission of the plurality of uplink transmissions; and
transmit, based at least in part on the demodulation reference signal port hopping configuration and using the first demodulation reference signal port, the first transmission, using the first demodulation reference signal port and in the first repetition opportunity, and the second transmission, using the second demodulation reference signal port and in the second repetition opportunity.

27. The non-transitory computer-readable medium of claim 26, wherein the configuration message configures the plurality of demodulation reference signal ports.

28. The UE of claim 22, wherein the one or more processors are further configured to:
  select the first demodulation reference signal port and the second demodulation reference signal port based at least in part on at least one of a UE identifier, a configured grant occasion index, a repetition opportunity index, a slot index, a mini-slot index, a symbol index, a demodulation reference signal location index, a resource block group index, or an uplink configured grant index.

29. The UE of claim 22, wherein the first transmission is transmitted in a first slot or mini-slot and the second transmission is transmitted in a second slot or mini-slot that is different from the first slot or mini-slot.

30. The UE of claim 22, wherein the first transmission is transmitted using a first portion of a physical uplink shared channel transmission and the second transmission is transmitted using a second portion of the physical uplink shared channel transmission that is different from the first portion of the physical uplink shared channel transmission.

* * * * *